United States Patent
Rana et al.

(10) Patent No.: US 9,634,562 B1
(45) Date of Patent: Apr. 25, 2017

(54) VOLTAGE DOUBLING CIRCUIT AND CHARGE PUMP APPLICATIONS FOR THE VOLTAGE DOUBLING CIRCUIT

(71) Applicants: STMicroelectronics International N.V., Amsterdam (NL); STMicroelectronics S.r.l., Agrate Brianza (IT)

(72) Inventors: Vikas Rana, Noida (IN); Marco Pasotti, Travaco' Sicomario (IT); Fabio De Santis, Milan (IT)

(73) Assignees: STMicroelectronics International N.V., Schiphol (NL); STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 15/177,830

(22) Filed: Jun. 9, 2016

(51) Int. Cl.
  *G05F 1/10* (2006.01)
  *G05F 3/02* (2006.01)
  *H02M 3/07* (2006.01)

(52) U.S. Cl.
  CPC ................... *H02M 3/073* (2013.01)

(58) Field of Classification Search
  USPC ................................ 327/535, 536
  See application file for complete search history.

(56) References Cited

U.S. PATENT DOCUMENTS

| | | | | |
|---|---|---|---|---|
| 9,209,757 B1* | 12/2015 | Thandri | ................ | H03F 1/0227 |
| 2003/0141530 A1* | 7/2003 | Kaneko | ............... | H01L 27/0222 257/299 |
| 2003/0146476 A1* | 8/2003 | Kaneko | ........... | H01L 21/823892 257/368 |
| 2003/0164511 A1* | 9/2003 | Kaneko | ............... | H01L 27/0222 257/215 |
| 2003/0173609 A1* | 9/2003 | Kaneko | ............... | H01L 27/0218 257/299 |
| 2004/0246044 A1* | 12/2004 | Myono | ................. | H02M 3/073 327/536 |
| 2005/0062520 A1* | 3/2005 | Kim | ........................ | H02M 3/07 327/536 |
| 2008/0048765 A1* | 2/2008 | Nonaka | ................... | H02M 3/07 327/536 |
| 2008/0150619 A1* | 6/2008 | Lesso | ..................... | H02M 3/07 327/536 |

(Continued)

*Primary Examiner* — Adam Houston
(74) *Attorney, Agent, or Firm* — Gardere Wynne Sewell LLP

(57) ABSTRACT

A voltage doubler circuit supports operation in a positive voltage boosting mode to positively boost voltage from a first node to a second node and operation in a negative voltage boosting mode to negatively boost voltage from the second node to the first node. The voltage doubler circuits receive two clock signals having different high voltage levels. A series of voltage doubler circuit are connected in a charge pump with controllable operation in the first and second modes. A connecting circuit interconnects the first and second nodes of the voltage doubler circuits to provide a first connection path, with a first input voltage, to support the positive voltage boosting mode operation and a second connection path, with a proper input voltage, to support the negative voltage boosting mode. A discharge circuit is provided to discharge the voltage doubler circuits when operation of the charge pump circuit is terminated.

40 Claims, 9 Drawing Sheets

(56) References Cited

U.S. PATENT DOCUMENTS

| | | | |
|---|---|---|---|
| 2008/0238535 A1* | 10/2008 | Horibata | G09G 3/3696 327/537 |
| 2009/0080257 A1* | 3/2009 | Oka | G11C 5/025 365/185.13 |
| 2010/0277152 A1* | 11/2010 | MacFarlane | H02M 3/07 323/288 |
| 2010/0327959 A1* | 12/2010 | Lee | H02M 3/07 327/536 |
| 2011/0050327 A1* | 3/2011 | Fujitani | H02M 3/07 327/536 |
| 2011/0084757 A1* | 4/2011 | Saman | H02M 3/07 327/536 |
| 2011/0121864 A1* | 5/2011 | Maeda | H03D 1/10 327/72 |
| 2011/0234306 A1* | 9/2011 | Hioka | H02M 3/07 327/537 |
| 2012/0249224 A1* | 10/2012 | Wei | H02M 3/07 327/536 |
| 2013/0093503 A1* | 4/2013 | Kok | H02M 3/07 327/536 |
| 2013/0314151 A1* | 11/2013 | Lesso | H02M 3/07 327/536 |
| 2013/0328824 A1* | 12/2013 | Krah | G06F 3/041 345/174 |
| 2015/0002214 A1* | 1/2015 | Englekirk | H03L 7/0891 327/536 |
| 2015/0015323 A1* | 1/2015 | Rahman | H02M 3/073 327/536 |
| 2015/0214837 A1* | 7/2015 | Ogawa | H02M 3/07 327/536 |
| 2015/0270775 A1* | 9/2015 | Ma | H02M 1/36 330/296 |
| 2015/0372590 A1* | 12/2015 | Seshita | H03K 5/08 327/536 |

* cited by examiner

VOLTAGE DOUBLING CIRCUIT AND CHARGE PUMP APPLICATIONS FOR THE VOLTAGE DOUBLING CIRCUIT

TECHNICAL FIELD

The present invention relates to voltage doubling circuits and charge pump circuits for the generation of positive and negative voltages.

BACKGROUND

A charge-pump circuit is a type of circuit configured to provide a voltage with a high voltage level that is either more positive than a power supply voltage (referred to as a high positive voltage) or has a reverse polarity with respect to the power supply voltage (referred to as a high negative voltage). In many circuit applications, both the high positive voltage and the high negative voltage are required, and it is common for these voltages to be generated on-chip.

The charge pump circuit works using a basic building block referred to as a "voltage doubler". For a positive charge pump, the voltage doubler circuit takes a DC input voltage (VDD) and outputs a double DC output voltage. By cascading N voltage doubler stages in series, a final output voltage can be reached that is substantially equal to (N+1)*VDD. For a negative charge pump, the voltage double circuit takes a ground input voltage (GND) and provides −VDD as the output voltage. By cascading N voltage doubler stages in series, a final output voltage can be reached that is substantially equal to −(N*VDD).

A common approach is to use two different charge-pump circuits to generate the desired positive voltage and negative voltage. A consequence of this approach is that the circuitry needs many on-chip capacitors that occupy a large area and the capacitors must be separately placed for each of the positive and negative charge-pump circuits. In addition, each charge pump circuit requires its own voltage regulator circuit in order to regulate the output voltage of each charge-pump at the desired positive and negative voltage level. The voltage regulator circuit typically requires resistors (for use in a voltage detection circuit) which, like the capacitors, occupy a large area and these resistors also must be separately placed for each charge pump.

It is known in the art to design a voltage doubler circuit that is operable to either generate the high positive voltage or the high negative voltage. An example of such a circuit is shown in FIG. 1 and is referred to in the art as a latch-based voltage doubler. The latch is formed by two cross-coupled CMOS inverter circuits 10 and 12. The source terminals of the p-channel MOS transistors of the latch circuit are connected to node B and the source terminals of the n-channel MOS transistors of the latch circuit are connected to node A. A capacitor is coupled to each pair of connected drain terminals of the MOS transistors of the latch circuit. A first capacitor coupled to inverter circuit 10 is configured to receive a clock signal CK and a second capacitor coupled to inverter circuit 12 is configured to receive a clock signal CKN (which is a logical inversion of the clock signal CK).

When the latch-based voltage doubler circuit is to be used as a positive voltage doubler, a positive supply voltage VDD is connected to node A and a high positive voltage of 2*VDD is generated at node B. Conversely, when the latch-based voltage doubler circuit is to be used as a negative voltage doubler, the ground supply voltage GND is connected to node B and a high negative voltage of −VDD is generated at node A. By cascading N latch-based voltage doubler circuits of FIG. 1 in series, the resulting charge pump circuit can generate, in ideal conditions with no current load and no conduction loss, the following voltage levels:

Vout=(N+1)*VDD; when connected in a positive high voltage configuration;

Vout=−N*VDD; when connected in a negative high voltage configuration.

In comparison to other prior art voltage doubler circuits well known to those skilled in the art, the latch-based voltage double circuit of FIG. 1 advantageously does not exhibit a threshold voltage drop across the connected stages of the charge pump. Furthermore, the circuit requires just the two clock phases (CK and CKN). However, the latch-based voltage doubler circuit does have the following problems:

a) each stage works well for generating the high positive voltage, but operation is not satisfactory when configured to generate the high negative voltage due to the presence of p-channel MOS transistors in the circuit. When negative voltages are to be generated, then the n-type well (body) for the p-channel MOS transistors are biased to the ground supply voltage level or ideally at a positive voltage level such as VDD. So, it cannot be connected to the local source terminal of the p-channel MOS. Otherwise, the n-type well to substrate junction can be forward biased and there will be functionality failure (see, FIG. 1, circuit 14);

b) due to biasing of the p-channel MOS transistors in body-effect, the n-type well to source/drain junctions are under a high voltage stress. With an increase in the number N of cascaded stages, this stress correspondingly increases and there can be reliability issues in negative voltage generation;

c) due to the fact that the p-channel MOS transistors need to be biased in body-effect, the threshold voltage of p-channel MOS transistors will increase with each cascaded stage of the N stage charge pump causing a reduction in the efficiency of charge-pump operation in negative voltage generation mode; and d) there is a limitation that the n-type well is to be biased to GND/VDD during negative voltage generation, but connected locally to the source terminal during positive voltage generation. So, for the circuit to be operational in both positive and negative voltage mode, additional circuitry is required to switch the biasing of the n-type well.

There is a need in the art for a voltage doubler circuit, suitable for use in positive and negative charge pumps, that can be used to generate either a positive or negative output voltage without compromising circuit reliability and performance.

SUMMARY

In an embodiment, a circuit comprises: a first node configured to receive a first voltage when said circuit is configured for operation in a positive voltage boosting mode and configured to output a negative voltage when said circuit is configured for operation in a negative voltage boosting mode; a second node configured to output a positive voltage in excess of said first voltage when said circuit is configured for operation in the positive voltage boosting mode and configured to receive a second voltage in excess of said negative voltage when said circuit is configured for operation in a negative voltage boosting mode; first and second intermediate nodes that are capacitively coupled to receive opposite phases of a first clock signal, respectively; and third and fourth intermediate nodes are capacitively coupled to receive opposite phases of a second clock signal, respectively.

In an embodiment, a circuit comprises: a first node; a second node; a first transistor and second transistor connected in a cross-coupled configuration, wherein the first transistor is coupled between the first node and a first intermediate node and the second transistor is coupled between the first node and a second intermediate node; a third transistor and fourth transistor connected in a cross-coupled configuration, wherein the third transistor is coupled between the first intermediate node and a third intermediate node and the fourth transistor is coupled between the second intermediate node and a fourth intermediate node; a fifth transistor coupled between the first intermediate node and the second node and having a control terminal coupled to the third intermediate node; a sixth transistor coupled between the second intermediate node and the second node and having a control terminal coupled to the fourth intermediate node; wherein the first and second intermediate nodes are capacitively coupled to receive opposite phases of a first clock signal, respectively; and wherein the third and fourth intermediate nodes are capacitively coupled to receive opposite phases of a second clock signal, respectively.

In an embodiment, a charge pump circuit comprises: a plurality of boosting circuits, wherein each boosting circuit has first node and a second node and is operable in a positive voltage boosting mode to positively boost voltage from the first node to the second node and is operable in a negative voltage boosting mode to negatively boost voltage from the second node to the first node; a first transistor coupled between a positive input voltage and the first node of a first one of the plurality of boosting circuits, said first transistor actuated by a first logic state of a first control signal to place the charge pump circuit in the positive voltage boosting mode; a second transistor coupled between a ground input voltage and the second node of the first one of the plurality of boosting circuits, said second transistor actuated by a second logic state of the first control signal to place the charge pump circuit in the negative voltage boosting mode; a third transistor coupled between the first node of the first one of the plurality of boosting circuits and the second node of a second one of the plurality of boosting circuits, said third transistor biased to permit conduction from the first node of the first one of the plurality of boosting circuits to the second node of the second one of the plurality of boosting circuits only when the charge pump circuit is operable in the negative voltage boosting mode; and a fourth transistor coupled between the second node of the first one of the plurality of boosting circuits and the first node of the second one of the plurality of boosting circuits, said fourth transistor biased to permit conduction from the second node of the first one of the plurality of boosting circuits to the first node of the second one of the plurality of boosting circuits only when the charge pump circuit is operable in the positive voltage boosting mode.

BRIEF DESCRIPTION OF THE DRAWINGS

For a better understanding of the embodiments, reference will now be made by way of example only to the accompanying figures in which.

DETAILED DESCRIPTION OF THE DRAWINGS

Figure 1:
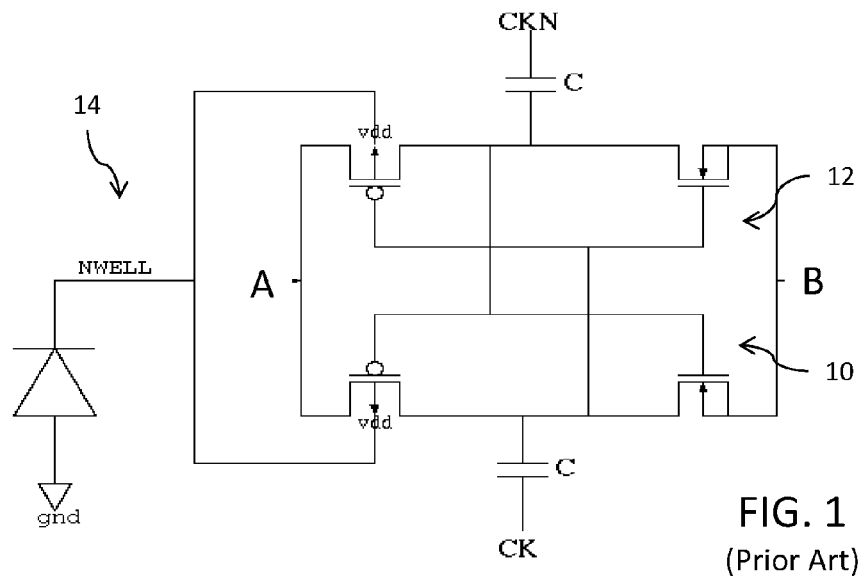
FIG. 1 is a circuit diagram for a latch-based voltage doubler.
Figure 2:
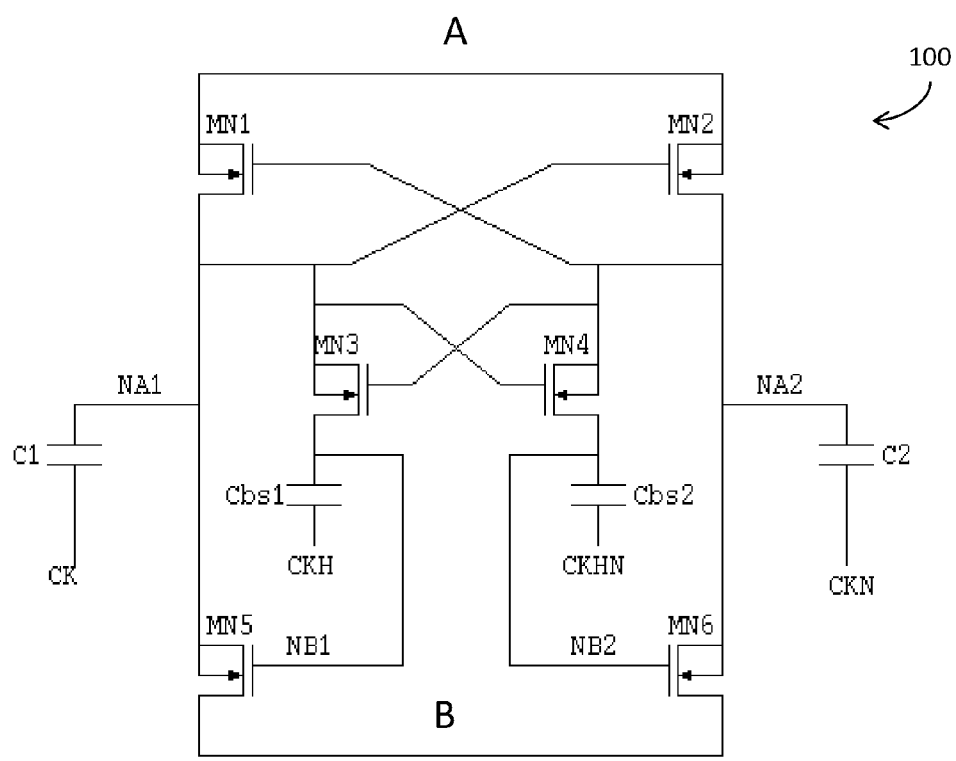
FIG. 2 is a circuit diagram for a voltage doubler.

Reference is now made to FIG. 2 showing a circuit diagram for a voltage doubler circuit (stage) 100. The circuit 100 includes an n-channel MOS transistor MN1 having a source terminal coupled to node A and a drain terminal coupled to node NA1 and an n-channel MOS transistor MN2 having a source terminal coupled to node A and a drain terminal coupled to node NA2. The transistors MN1 and MN2 are cross-coupled with the gate terminal of transistor MN1 coupled to the drain terminal of transistor MN2 at node NA2 and the gate terminal of transistor MN2 coupled to the drain terminal of transistor MN1 at node NA1.

The circuit 100 further includes an n-channel MOS transistor MN3 having a source terminal coupled to node NA1 and a drain terminal coupled to node NB1 and an n-channel MOS transistor MN4 having a source terminal coupled to node NA2 and a drain terminal coupled to node NB2. The transistors MN3 and MN4 are cross-coupled with the gate terminal of transistor MN3 coupled to the source terminal of transistor MN4 at node NA2 and the gate terminal of transistor MN4 coupled to the source terminal of transistor MN3 at node NA1.

The circuit 100 still further includes an n-channel MOS transistor MN5 having a drain terminal coupled to node B and a source terminal coupled to node NA1 and an n-channel MOS transistor MN6 having a drain terminal coupled to node B and a source terminal coupled to node NA2. The gate terminal of transistor MN5 is coupled to node NB1 and the gate terminal of transistor MN6 is coupled to node NB2.

A capacitor C1 has one terminal coupled to node NA1 and another terminal coupled to receive a clock signal CK. A capacitor C2 has one terminal coupled to node NA2 and another terminal coupled to receive a clock signal CKN (which is a logical inversion of the clock signal CK). A capacitor Cbs1 has one terminal coupled to node NB1 and another terminal coupled to receive a clock signal CKH. A capacitor Cbs2 has one terminal coupled to node NB2 and another terminal coupled to receive a clock signal CKHN (which is a logical inversion of the clock signal CHK).

Figure 3:
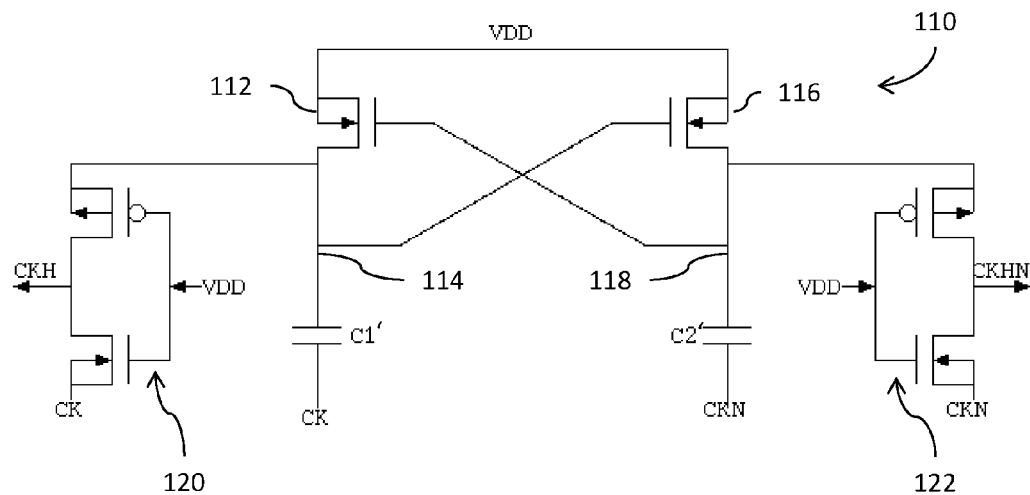
FIG. 3 is a circuit diagram for a clock voltage boosting circuit.

The clock signals CKH and CKHN are generated from the clock signals CK and CKN using a clock voltage boosting circuit 110 shown in FIG. 3. The circuit 110 includes an n-channel MOS transistor 112 having a source terminal coupled to a positive supply voltage node VDD and a drain terminal coupled to node 114 and an n-channel MOS transistor 116 having a source terminal coupled to the VDD node and a drain terminal coupled to node 118. The transistors 112 and 116 are cross-coupled with the gate terminal of transistor 112 coupled to the drain terminal of transistor 116 at node 118 and the gate terminal of transistor 116 coupled to the drain terminal of transistor 112 at node 114.

A capacitor C1' has one terminal coupled to node 114 and another terminal coupled to receive the clock signal CK. A capacitor C2' has one terminal coupled to node 118 and another terminal coupled to receive the clock signal CKN.

A CMOS inverter 120 has an input coupled to the VDD node and an output generating the clock signal CKH. A source terminal of the p-channel MOS transistor in inverter 120 is coupled to the node 114 and a source terminal of the n-channel MOS transistor in inverter 120 is coupled to receive the clock signal CK.

A CMOS inverter 122 has an input coupled to the VDD node and an output generating the clock signal CKHN. A source terminal of the p-channel MOS transistor in inverter 122 is coupled to the node 118 and a source terminal of the n-channel MOS transistor in inverter 122 is coupled to receive the clock signal CKN.

Figure 4A:
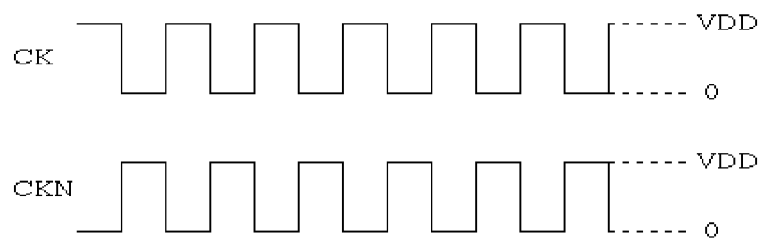
FIGS. 4A and 4B show clock signal waveforms.
Figure 4B:
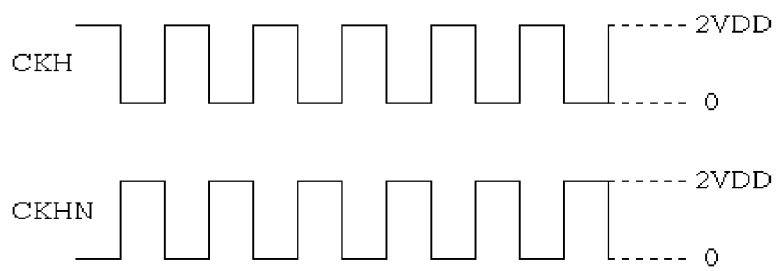

The clock voltage boosting circuit 110 functions to level shift the clock signals CK and CKN to generate the clock signals CKH and CKHN. FIG. 4A shows the waveforms for the clock signals CK and CKN. FIG. 4B shows the waveforms for the clock signals CKH and CKHN. It will be noted that the clock voltage boosting circuit 110 functions to boost the high voltage level of the clock signals CKH and CKHN to 2*VDD, with the high voltage level of the clock signals CK and CKN being VDD. The clock signals CKH and CKHN have a same phase as the clock signals CK and CKN, respectively.

The voltage doubler circuit 100 of FIG. 2 is operable to generate either a positive voltage or a negative voltage. When the voltage doubler circuit 100 is to be used as a positive voltage doubler (i.e., operating in a high positive voltage mode), the supply voltage VDD is connected to node A and a high positive voltage of 2*VDD is generated at node B. Conversely, when the voltage doubler circuit 100 is to be used as a negative voltage doubler (i.e., operating in a high negative voltage mode), the ground supply voltage GND is connected to node B and a high negative voltage of −VDD is generated at node A.

The voltage doubler circuit 100 advantageously operates from just two clocks (CK/CKH and CKN/CKNH).

The voltage doubler circuit 100 operates as follows in the high positive voltage mode:

To begin, assume that no clock is present. In this situation, the nodes NA1 and NA2 will be charged to the VDD-Vt voltage level, where Vt is the threshold voltage of the n-channel MOS transistors MN1 and MN2. Now, assume the clock signal is applied. With the clock signal CK at the VDD voltage level and the clock signal CKN at the 0 (ground GND) voltage level, then the clock signal CKH is at the 2*VDD voltage level and the clock signal CKHN is at the 0 voltage level. In this configuration, the node NA1 will shift to the 2VDD-Vt voltage level and the node NA2 will shift to the VDD voltage level. Due to the cross coupling between transistors MN3 and MN4, the node NB1 will be charged to the 3VDD voltage level and the node NB2 will be charged to the VDD voltage level. As the node NB1 is at the 3VDD voltage level and the node NA1 is at the 2VDD voltage level, the n-channel MOS transistor MN5 has sufficient Vgs (gate to source voltage) to pass the 2VDD voltage from node NA1 to node B. In this way, a high positive voltage (higher than input supply voltage VDD) is generated and passed for output. So, during high positive voltage mode operation, the voltage VDD is applied at node A and the 2VDD voltage is generated at node B. During the opposite phase of the clocks, the nodes NA1 and NA2 switch between the VDD voltage level and the 2VDD voltage level. Similarly, the nodes NB1 and NB2 switch between the VDD voltage level and the 3VDD voltage level.

It will be noted that the foregoing voltage levels are mentioned with the assumption of an ideal operating situation when there is no current load at the output and there is no charge loss.

The voltage doubler circuit 100 operates as follows in the high negative voltage mode:

With the ground reference voltage GND applied to node B, when the clock signal CKH transitions to the 2VDD voltage level, the clock signal CK is simultaneously at the VDD voltage level, and the n-channel MOS transistor MN5 turns on and node NA1 is charged to the 0 (GND) voltage level. During the next clock cycle, the clock signal CKH switches from the 2VDD voltage level to the 0 voltage level, with the clock signal CK changing state from the VDD voltage level to 0 voltage level, and the node NA1 accordingly transitions from the 0 voltage level to the −VDD voltage level. Also, the node NB1 discharges to the −VDD voltage level via the transistor MN3 and the switch off of the transistor MN5. In this way, the node NA1 also goes to the −VDD voltage level. Due to effect of the clock signals CKN and CKHN, the node NA2 is charged to the 0 (GND) voltage level via transistor MN6. As the NA2 is at the 0 voltage level, and the NA1 is at the −VDD voltage level, this configuration causes the transistor MN1 to turn on and pass the −VDD voltage level voltage to the node A. During this negative high voltage mode of operation, the nodes NA1 and NA2 switch between the 0 voltage level and the −VDD voltage level, and vice versa. Similarly, the nodes NB1 and NB2 switch between the VDD voltage level and the −VDD voltage level, and vice versa.

The circuit 100 possesses at least the following advantages: a) a single circuit configuration can be used to generate either a positive or a negative voltage depending on the configured operating mode; b) there is no threshold voltage drop in output voltage so the efficiency of this voltage doubler circuit stage is improved; c) because a single voltage doubler circuit can be used for positive and negative voltage doubling operation, there is a reduction in occupied circuit area in comparison with some prior art circuits, and there is also a reduction in power consumption; d) the circuit uses n-channel MOS transistors only, so there is no condition of body-bias and junction stress that is common with some prior art circuits, and thus circuit reliability is not an issue; and e) the circuit uses a cross coupled architecture of NMOS switches, so there is no need for a non-overlapping clock scheme or a four phase clock scheme as is the case with some prior art circuits.

Figure 5:
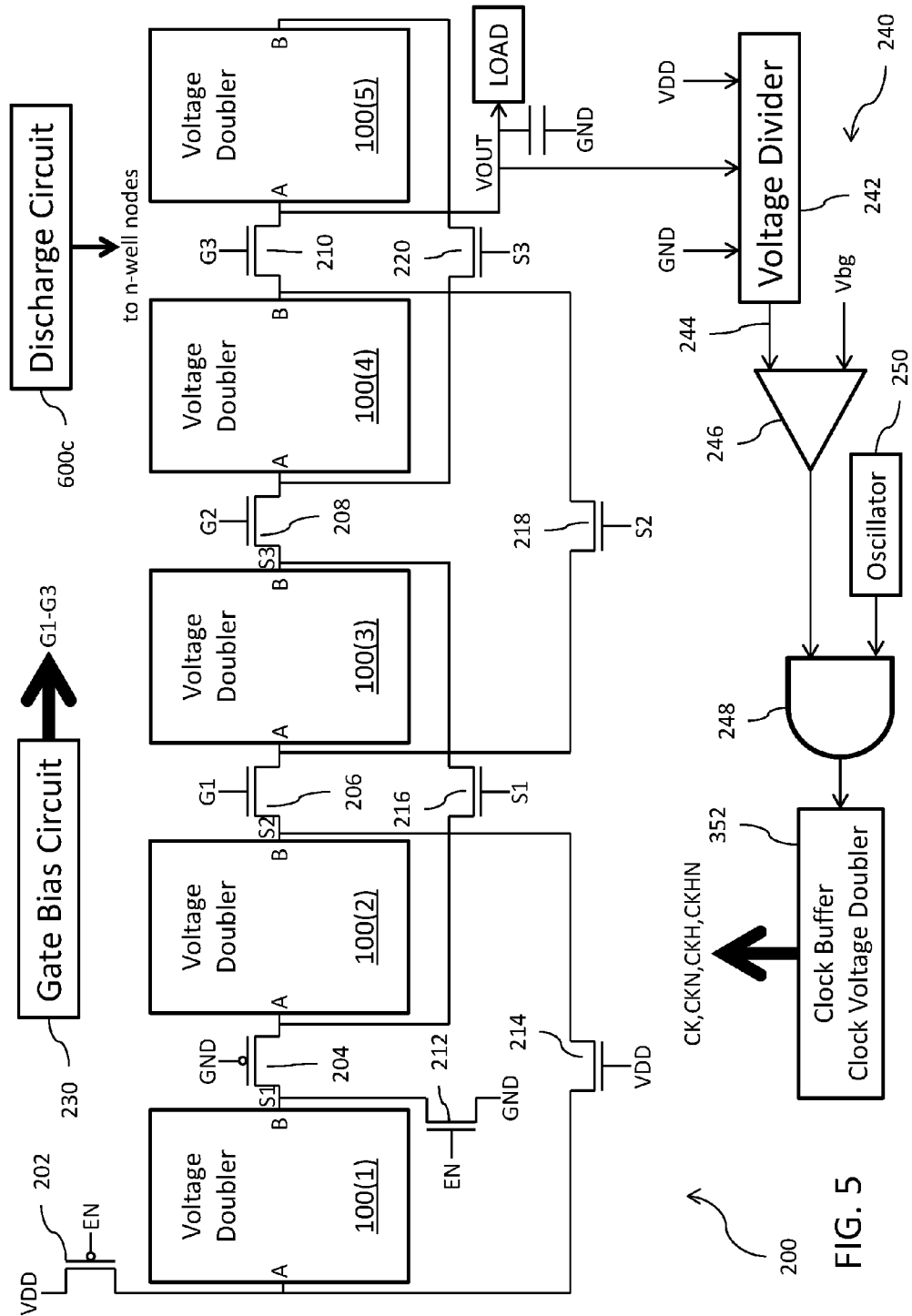
FIG. 5 is a circuit diagram for a charge pump formed from cascaded voltage doubler circuits of FIG. 2 operable in both a positive voltage mode and negative voltage mode driving a common load condition.

Reference is now made to FIG. 5 showing a multi-stage charge pump circuit 200 using a plurality of the voltage doubler circuits 100 coupled in cascade to drive a common load condition (LOAD). In this example implementation, there are N=5 voltage doubler circuits 100 coupled in cascade. Furthermore, the cascaded coupling of the voltage doubler circuits 100 permits operation of the multi-stage charge pump circuit 200 in either a high positive voltage mode or a high negative voltage mode (to drive the common load) depending on the logic state of a polarity control signal EN. When the polarity control signal EN is logic 0, the multi-stage charge pump circuit 200 is configured for operation in the high positive voltage mode to generate an output voltage VOUT=5*VDD (it being noted that only four of the stages 100 are used to generate this positive output voltage). Conversely, when the polarity control signal EN is logic 1, the multi-stage charge pump circuit 200 is configured for operation in the high negative voltage mode to generate an output voltage VOUT=−5*VDD (it being noted that all five stages 100 are used to generate this negative output voltage).

A p-channel MOS transistor 202 has a source terminal coupled to the VDD node, a drain terminal coupled to the node A of the first voltage doubler circuit 100(1) and a gate terminal coupled to receive the polarity control signal EN. A p-channel MOS transistor 204 has a source terminal (at node S1) coupled to the node B of the first voltage doubler circuit 100(1), a drain terminal coupled to the node A of the second voltage doubler circuit 100(2) and a gate terminal coupled to the ground GND reference voltage node. An n-channel MOS transistor 206 has a drain terminal (at node S2) coupled to the node B of the second voltage doubler circuit 100(2), a source terminal coupled to the node A of the third voltage doubler circuit 100(3) and a gate terminal coupled to receive a bias control signal G1. An n-channel MOS transistor 208 has a drain terminal (at node S3) coupled to the node B of the third voltage doubler circuit 100(3), a source terminal coupled to the node A of the fourth voltage doubler circuit 100(4) and a gate terminal coupled to receive a bias control signal G2. An n-channel MOS transistor 210 has a drain terminal coupled to the node B of the fourth voltage doubler circuit 100(4), a source terminal coupled to the node A of the fifth voltage doubler circuit 100(5) and a gate terminal coupled to receive a control signal G3.

An n-channel MOS transistor 212 has a source terminal coupled to the ground GND node, a drain terminal (at node S1) coupled to the node B of the first voltage doubler circuit 100(1) and a gate terminal coupled to receive the polarity control signal EN. An n-channel MOS transistor 214 has a source terminal coupled to the node A of the first voltage doubler circuit 100(1), a drain terminal (at node S2) coupled to the node B of the second voltage doubler circuit 100(2) and a gate terminal coupled to the VDD node. An n-channel MOS transistor 216 has a source terminal coupled to the node A of the second voltage doubler circuit 100(2), a drain terminal (at node S3) coupled to the node B of the third voltage doubler circuit 100(3) and a gate terminal coupled to receive the voltage at node S1 (i.e., at the node B of the first voltage doubler circuit 100(1)). An n-channel MOS transistor 218 has a source terminal coupled to the node A of the third voltage doubler circuit 100(3), a drain terminal coupled to the node B of the fourth voltage doubler circuit 100(4) and a gate terminal coupled to receive the voltage at node S2 (i.e., at node B of the second voltage doubler circuit 100(2)). An n-channel MOS transistor 220 has a source terminal coupled to the node A of the fourth voltage doubler circuit 100(4), a drain terminal coupled to the node B of the fifth voltage doubler circuit 100(5) and a gate terminal coupled to receive the voltage at node S3 (i.e., at node B of the third voltage doubler circuit 100(3)).

The combination of MOS transistors 204-210 and 214-220 interconnecting the nodes A and B of the voltage doubler circuits 100 are used to guide and route generated voltages at each stage to a common output node VOUT depending on operating mode.

When the polarity control signal EN is logic 0, the multi-stage charge pump circuit 200 is configured for operation in the high positive voltage mode. Transistor 202 is turned on supplying the VDD voltage to the node A of the first voltage doubler circuit 100(1). Transistor 212 is turned off. Due to the first voltage doubler circuit 100(1) working as a positive charge-pump, the node B of the first voltage doubler circuit 100(1) will substantially reach the 2VDD voltage level (within 0-2 percent in an ideal scenario: i.e., where charge loss due to parasitic capacitances is ignored and there is no current load at the output). The gate terminal of the p-channel MOS transistor 204 is at the GND voltage which causes transistor 204 to turn on and pass the 2VDD voltage level to node A of the second voltage doubler circuit 100(2). Working as a positive charge-pump, the second voltage doubler circuit 100(2) will substantially generate the 3VDD voltage level (within 0-2 percent in the ideal scenario) at the node B of the second voltage doubler circuit 100(2). A gate bias circuit 230, operating generates the control signal G1 having a bias voltage that will turn on the n-channel MOS transistor 206 to pass the 3VDD voltage level to the A node of the third voltage doubler circuit 100(3). Working as a positive charge-pump, the third voltage doubler circuit 100(3) will substantially generate the 4VDD voltage level (within 0-2 percent in the ideal scenario) at the node B of the third voltage doubler circuit 100(3). The gate bias circuit 230 further generates the control signal G2 having a bias voltage that will turn on the n-channel MOS transistor 208 to pass the 4VDD voltage level to the A node of the fourth voltage doubler circuit 100(4). Working as a positive charge-pump, the fourth voltage doubler circuit 100(4) will substantially generate the 5VDD voltage level (within 0-2 percent in the ideal scenario) at the node B of the fourth voltage doubler circuit 100(4). The gate bias circuit 230 further generates the control signal G3 having a bias voltage that will turn on the n-channel MOS transistor 210 to pass the 5VDD voltage level to the output voltage VOUT node. Again, it is noted that only four of the stages 100 are used in the high positive voltage mode.

It will be noted that during high positive voltage mode, the voltages at nodes S1-S3 control the transistors 216, 218 and 220 to be turned off. Additionally, because of the VDD voltage present at both the gate and source of transistor 214, the transistor 214 is also turned off.

The fifth voltage doubler circuit 100(4) is also available, if desired in the high positive voltage mode, to substantially generate the 6VDD voltage level (within 0-2 percent in the ideal scenario) at its node B. In support of this operation, the gate bias circuit 230 may generate the bias control signal G3 having a bias voltage that will turn on the n-channel MOS transistor 210 to pass the 5VDD voltage level to the A node of the fifth voltage doubler circuit 100(5).

When the polarity control signal EN is logic 1, the multi-stage charge pump circuit 200 is instead configured for operation in the high negative voltage mode. Transistor 212 is turned on supplying the ground GND voltage to the node B of the first voltage doubler circuit 100(1). Transistor 202 is turned off. Due to the first voltage doubler circuit 100(1) working as a negative charge-pump, the node A of the first voltage doubler circuit 100(1) will substantially reach the −VDD voltage level (within 0-2 percent in the ideal scenario). The gate terminal of the n-channel MOS transistor 214 is at the VDD voltage which causes transistor 214 to turn on and pass the −VDD voltage level to node B of the second voltage doubler circuit 100(2) at node S2. It will be noted that p-channel MOS transistor 204 with gate and source terminals both at the GND voltage is turned off so as to block the −2VDD voltage level at the node A of the second voltage doubler circuit 100(2) from being applied to the node B of the first voltage doubler circuit 100(1). Working as a negative charge-pump, the second voltage doubler circuit 100(2) will substantially generate the −2VDD voltage level (within 0-2 percent in the ideal scenario) at the node A of the second voltage doubler circuit 100(2). The voltage at node S1 (i.e., at node B of the first voltage doubler circuit 100(1)) is at the GND voltage and this will turn on the n-channel MOS transistor 216 to pass the −2VDD voltage level to the node B of the third voltage doubler circuit 100(3) at node S3. Working as a negative charge-pump, the third voltage doubler circuit 100(3) will substantially generate the −3VDD voltage level (within 0-2 percent in the ideal scenario) at the node A of the third voltage doubler circuit 100(3). The voltage at node S2 (i.e., at node B of the second voltage doubler circuit 100(2)) is at the −VDD voltage level and this voltage will turn on the n-channel MOS transistor 218 to pass the −3VDD voltage level to the node B of the fourth voltage doubler circuit 100(4). Working as a negative charge-pump, the fourth voltage doubler circuit 100(4) will substantially generate the −4VDD voltage level (within 0-2 percent in the ideal scenario) at the node A of the fourth voltage doubler circuit 100(4). The voltage at node S3 (i.e., at node B of the third voltage doubler circuit 100(3)) is at the −2VDD voltage level and this voltage will turn on the n-channel MOS transistor 220 to pass the −4VDD voltage level to node B of the fifth voltage doubler circuit 100(5). Working as a negative charge-pump, the fifth voltage doubler circuit 100(5) will substantially generate the −5VDD voltage level (within 0-2 percent in the ideal scenario) at the node A of the fifth voltage doubler circuit 100(5), that node being connected to the output voltage VOUT node.

It will be noted that during high negative voltage mode, the gate bias circuit 230 controls the transistors 206, 208 and 210 to be turned off. Additionally, because of the GND voltage present at both the gate and source of transistor 204, the transistor 204 is also turned off.

FIG. 5 further shows a block diagram of a clock generation and output regulation circuit 240. The circuit 240 includes a voltage divider circuit 242 that, for example, comprises a resistive voltage divider formed by a plurality of series connected resistors having a plurality of tap nodes. The voltage divider circuit 242 is coupled between the output voltage VOUT node and either the ground GND node or VDD node depending on whether the multi-stage charge pump circuit 200 is configured for operation in the high positive or high negative voltage mode, respectively. A feedback voltage 244 is taken from one of the tap nodes of the voltage divider circuit 242 and applied to one input of a comparator circuit 246. A second input of the comparator circuit 246 receives a reference voltage (for example, a bandgap voltage Vbg). An output of the comparator circuit 246 is coupled to a first input of a logic AND gate 248. A second input of the logic AND gate 248 receives a clock signal output from an oscillator circuit 250. The logic AND gate functions to selectively pass the clock signal from the oscillator 250 to an input of a clock buffer and clock voltage doubler circuit 252 in response to the output of the comparator circuit 246. The clock buffer and clock voltage doubler circuit 252 may, for example, include the circuit shown in FIG. 3. The clock buffer and clock voltage doubler circuit 252 functions to output the clock signals CK, CKN, CKH and CKHN for application to the plurality of voltage doubler circuits 100(1)-100(5).

When the charge pump is configured for operation in the high positive voltage mode, the voltage divider circuit 242 is coupled between the output voltage VOUT node and the ground GND node, and the feedback voltage 244 is taken from a first tap node of the voltage divider circuit 242. When the charge pump is configured for operation in the high negative voltage mode, the voltage divider circuit 242 is coupled between the output voltage VOUT node and the VDD node, and the feedback voltage 244 is taken from a second tap node of the voltage divider circuit 242. The tap nodes are selected to control regulation of the output voltage VOUT. The output voltage VOUT is sensed by the voltage divider circuit 242 to generate the feedback voltage 244 which is compared to the Vbg reference voltage. The result of the comparison controls whether the logic AND gate 248 passes the clock signal to generate the clock phases CK, CKN, CKH and CKHN to drive the voltage boosting and charge pumping operation. So long as the voltage at the output is less than a certain threshold set by the voltage divider circuit 242 and Vbg reference voltage, the charge pump circuit 200 continues to operate. If the output voltage exceeds the certain threshold, the clock is blocked by the logic AND gate 248 and the voltage boosting and charge pumping operation is interrupted.

An advantage of the circuit of FIG. 5 is that the charge pump circuit can generate either a positive voltage or a negative voltage, of substantially equal absolute magnitude, at a common output node to drive a common load condition.

Figure 6:
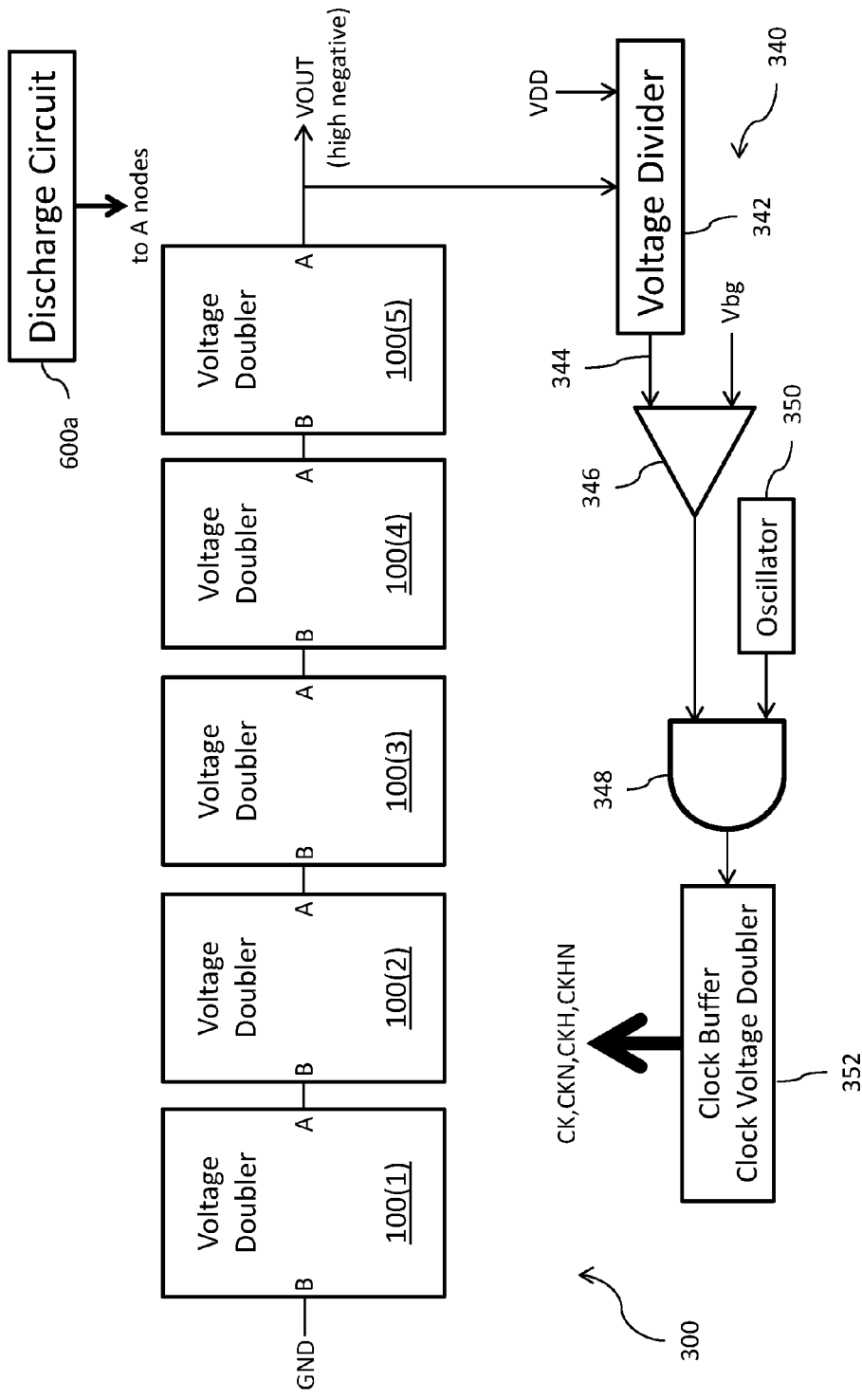
FIG. 6 is a circuit diagram for a charge pump formed from cascaded voltage doubler circuits of FIG. 2 operable in a negative voltage mode.

Reference is now made to FIG. 6 showing a multi-stage charge pump circuit 300 using a plurality of the voltage doubler circuits 100 coupled in cascade and operating to generate a high negative output voltage. In this example implementation, there are N=5 voltage doubler circuits 100 coupled in cascade. Thus, the multi-stage charge pump circuit 300 is configured to generate an output voltage VOUT=−5*VDD.

The node B of the first voltage doubler circuit 100(1) is coupled to receive the ground GND voltage. Working as a negative charge-pump, the node A of the first voltage doubler circuit 100(1) will substantially reach the −VDD voltage level (within 0-2 percent in the ideal scenario). The node A of the first voltage doubler circuit 100(1) is coupled to apply the −VDD voltage level to the node B of the second voltage doubler circuit 100(2). Working as a negative charge-pump, the node A of the second voltage doubler circuit 100(2) will substantially reach the −2VDD voltage level (within 0-2 percent in the ideal scenario). The node A of the second voltage doubler circuit 100(2) is coupled to apply the −2VDD voltage level to the node B of the third voltage doubler circuit 100(3). Working as a negative charge-pump, the node A of the third voltage doubler circuit 100(3) will substantially reach the −3VDD voltage level (within 0-2 percent in the ideal scenario). The node A of the third voltage doubler circuit 100(3) is coupled to apply the −3VDD voltage level to the node B of the fourth voltage doubler circuit 100(4). Working as a negative charge-pump, the node A of the fourth voltage doubler circuit 100(4) will substantially reach the −4VDD voltage level (within 0-2 percent in the ideal scenario). The node A of the fourth voltage doubler circuit 100(4) is coupled to apply the −4VDD voltage level to the node B of the fifth voltage doubler circuit 100(5). Working as a negative charge-pump, the node A of the fifth voltage doubler circuit 100(5) will substantially reach the −5VDD voltage level (within 0-2 percent in the ideal scenario) which is the output voltage VOUT.

FIG. 6 further shows a block diagram of a clock generation and output regulation circuit 340. The circuit 340 includes a voltage divider circuit 342 that, for example, comprises a resistive voltage divider formed by a plurality of series connected resistors having at least one tap node. The voltage divider circuit 342 is coupled between the output voltage VOUT node and the VDD node. A feedback voltage 344 is taken from the tap node of the voltage divider circuit 342 and applied to one input of a comparator circuit 346. A second input of the comparator circuit 346 receives a reference voltage (for example, a bandgap voltage Vbg). An output of the comparator circuit 346 is coupled to a first input of a logic AND gate 348. A second input of the logic AND gate 348 receives a clock signal output from an oscillator circuit 350. The logic AND gate functions to selectively pass the clock signal from the oscillator 350 to an input of a clock buffer and clock voltage doubler circuit 352 in response to the output of the comparator circuit 346. The clock buffer and clock voltage doubler circuit 352 may, for example, include the circuit shown in FIG. 3. The clock buffer and clock voltage doubler circuit 352 functions to output the clock signals CK, CKN, CKH and CKHN for application to the plurality of voltage doubler circuits 100(1)-100(5).

The output voltage VOUT is sensed by the voltage divider circuit 342 to generate the feedback voltage 344 which is compared to the Vbg reference voltage. The result of the comparison controls whether the logic AND gate 348 passes the clock signal to generate the clock phases CK, CKN, CKH and CKHN to drive the voltage boosting and charge pumping operation. So long as the voltage at the output is less than a certain threshold (for example, −5VDD) set by the voltage divider circuit 342 and Vbg reference voltage, the charge pump circuit 300 continues to operate. If the output voltage exceeds the certain threshold, the clock is blocked by the logic AND gate 348 and the voltage boosting and charge pumping operation is interrupted.

Figure 7:
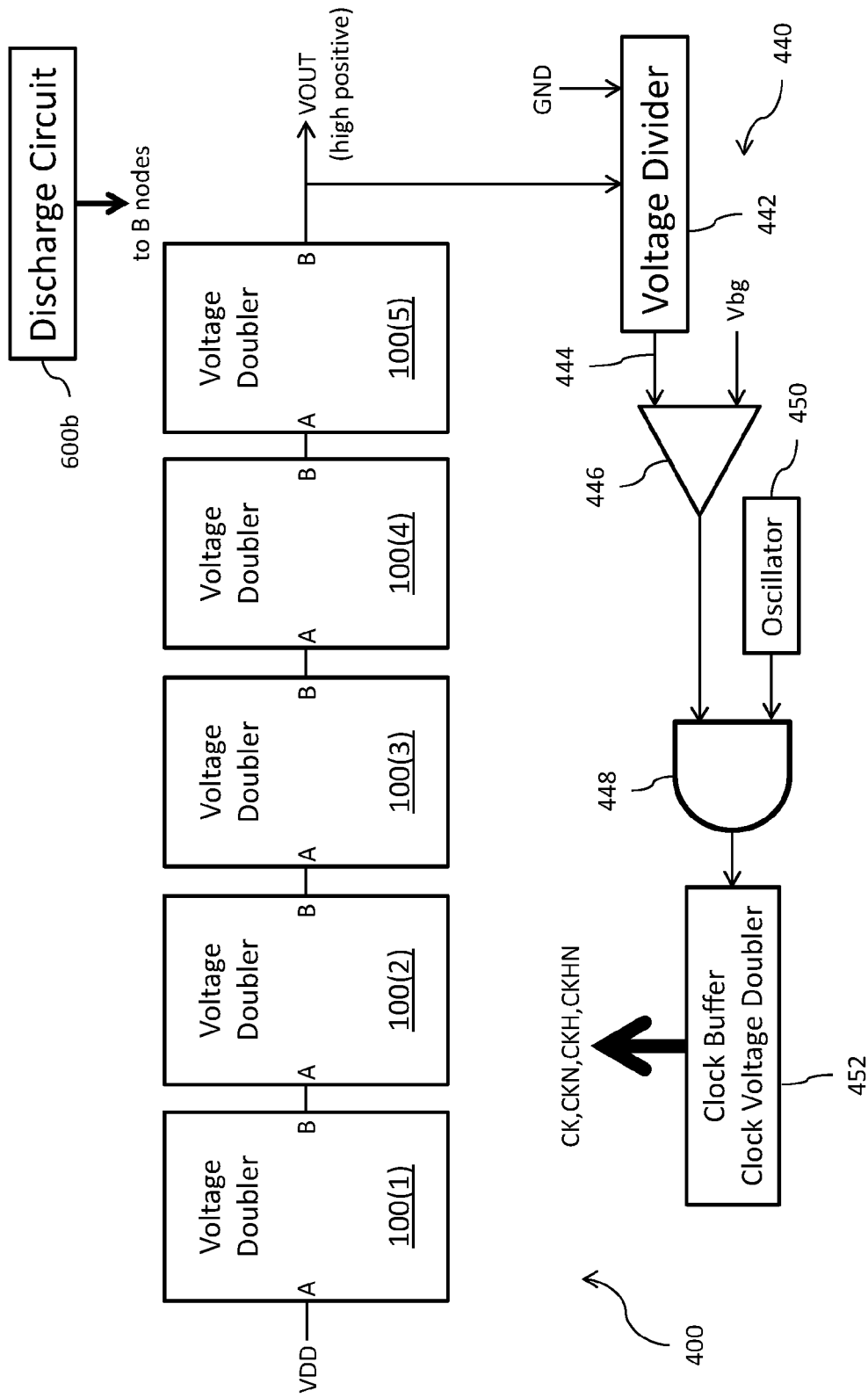
FIG. 7 is a circuit diagram for a charge pump formed from cascaded voltage doubler circuits of FIG. 2 operable in a positive voltage mode.

Reference is now made to FIG. 7 showing a multi-stage charge pump circuit 400 using a plurality of the voltage doubler circuits 100 coupled in cascade and operating to generate a high positive output voltage. In this example implementation, there are N=5 voltage doubler circuits 100 coupled in cascade. Thus, the multi-stage charge pump circuit 400 is configured to generate an output voltage VOUT=6*VDD.

The node A of the first voltage doubler circuit 100(1) is coupled to receive the VDD voltage. Working as a positive charge-pump, the node B of the first voltage doubler circuit 100(1) will substantially reach the 2VDD voltage level (within 0-2 percent in the ideal scenario). The node B of the first voltage doubler circuit 100(1) is coupled to apply the 2VDD voltage level to the node A of the second voltage doubler circuit 100(2). Working as a positive charge-pump, the node B of the second voltage doubler circuit 100(2) will substantially reach the 3VDD voltage level (within 0-2 percent in the ideal scenario). The node B of the second voltage doubler circuit 100(2) is coupled to apply the 3VDD voltage level to the node A of the third voltage doubler circuit 100(3). Working as a positive charge-pump, the node B of the third voltage doubler circuit 100(3) will substantially reach the 4VDD voltage level (within 0-2 percent in the ideal scenario). The node B of the third voltage doubler circuit 100(3) is coupled to apply the 4VDD voltage level to the node A of the fourth voltage doubler circuit 100(4). Working as a positive charge-pump, the node B of the fourth voltage doubler circuit 100(4) will substantially reach the 5VDD voltage level (within 0-2 percent in the ideal scenario). The node B of the fourth voltage doubler circuit 100(4) is coupled to apply the 5VDD voltage level to the node A of the fifth voltage doubler circuit 100(5). Working as a positive charge-pump, the node B of the fifth voltage doubler circuit 100(5) will substantially reach the 6VDD voltage level (within 0-2 percent in the ideal scenario) which is the output voltage VOUT.

FIG. 7 further shows a block diagram of a clock generation and output regulation circuit 440. The circuit 440 includes a voltage divider circuit 442 that, for example, comprises a resistive voltage divider formed by a plurality of series connected resistors having at least one tap node. The voltage divider circuit 442 is coupled between the output voltage VOUT node and the GND node. A feedback voltage 444 is taken from the tap node of the voltage divider circuit 442 and applied to one input of a comparator circuit 446. A second input of the comparator circuit 446 receives a reference voltage (for example, a bandgap voltage Vbg). An output of the comparator circuit 446 is coupled to a first input of a logic AND gate 448. A second input of the logic AND gate 448 receives a clock signal output from an oscillator circuit 450. The logic AND gate functions to selectively pass the clock signal from the oscillator 450 to an input of a clock buffer and clock voltage doubler circuit 452 in response to the output of the comparator circuit 446. The clock buffer and clock voltage doubler circuit 452 may, for example, include the circuit shown in FIG. 3. The clock buffer and clock voltage doubler circuit 452 functions to output the clock signals CK, CKN, CKH and CKHN for application to the plurality of voltage doubler circuits 100(1)-100(5).

The output voltage VOUT is sensed by the voltage divider circuit 442 to generate the feedback voltage 444 which is compared to the Vbg reference voltage. The result of the comparison controls whether the logic AND gate 448 passes the clock signal to generate the clock phases CK, CKN, CKH and CKHN to drive the voltage boosting and charge pumping operation. So long as the voltage at the output is less than a certain threshold (for example, 6VDD) set by the voltage divider circuit 442 and Vbg reference voltage, the charge pump circuit 400 continues to operate. If the output voltage exceeds the certain threshold, the clock is blocked by the logic AND gate 448 and the voltage boosting and charge pumping operation is interrupted.

Figure 8:
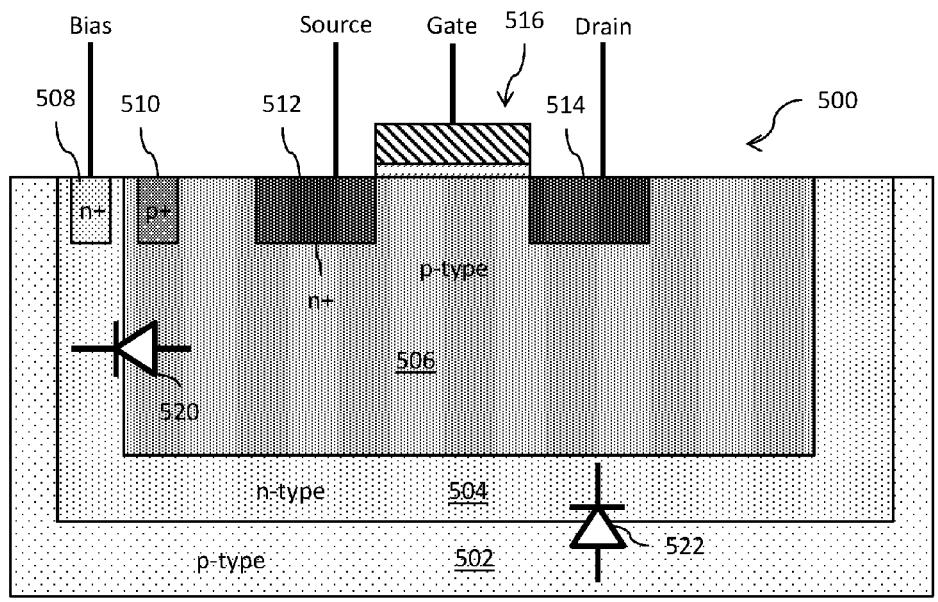
FIG. 8 is a cross-section diagram of an integrated n-channel MOS transistor fabricated in triple well technology.

Reference is now made to FIG. 8 showing a cross-section diagram of an integrated n-channel MOS transistor 500 fabricated in triple well technology. The transistor 500 is formed in a lightly doped p-type substrate 502. An n-type well 504 is formed in the substrate. An isolated p-type well 506 is formed in the n-type well 504. A highly doped n-type region 508 is formed at the surface of substrate within the n-type well 504. A highly doped p-type region 510 is formed at the surface of the substrate within the isolated p-type well 506. A highly doped n-type source region 512 and a highly doped n-type drain region 514 are formed at the surface of the substrate in the isolated p-type well 506 on opposite sides of a channel region 516. An insulated gate 518 is formed over the channel region 516.

The integrated n-channel MOS transistor 500 includes two parasitic diodes. A first parasitic diode 520 is formed between the isolated p-type well 506 and the n-type well 504. A second parasitic diode 520 is formed between the p-type substrate 502 and the n-type well 504. In general, the p-type substrate is always biased to the ground GND voltage and the n-type well 504 and the isolated p-type well 506 are biased in such a way that the parasitic diodes 520 and 522 will always be reverse biased. Hence, the bias signal (BIAS)

for the n-type well 504 applies a most positive voltage of the integrated circuit (of course, respecting a safe operating area limit of the integrated circuit).

Figure 9:
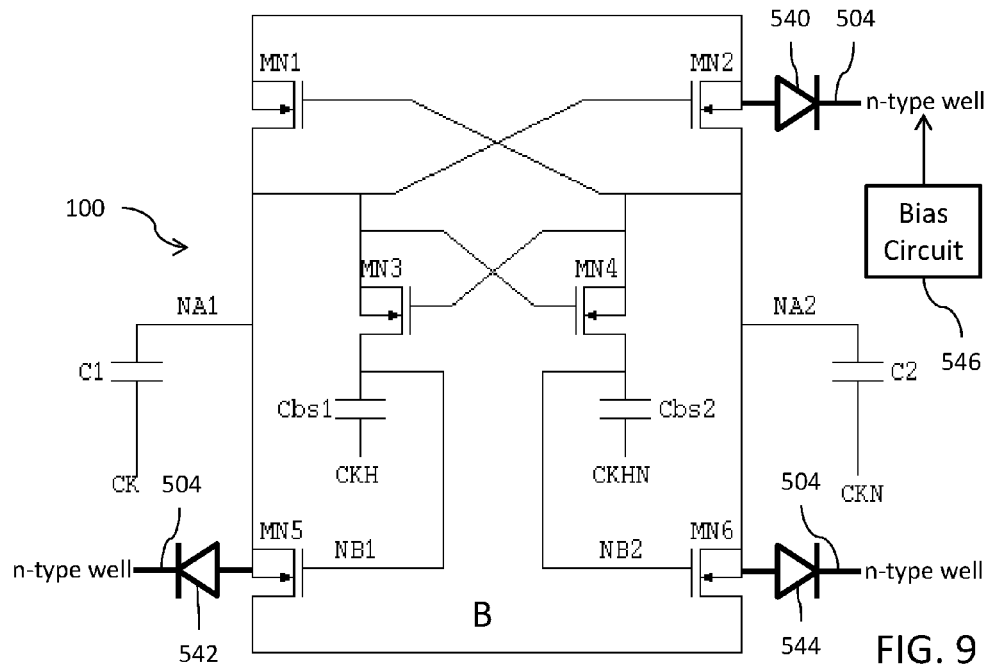
FIG. 9 is a circuit diagram for a voltage doubler using the n-channel MOS transistor structure of FIG. 8 showing the presence of parasitic diodes.

Reference is now made to FIG. 9 showing a circuit diagram for the voltage doubler circuit 100 (see, also, FIG. 2) where the n-channel MOS transistors MN1, MN2, MN5 and MN6 are implemented using the n-channel MOS transistor structure of FIG. 8. As a result, three parasitic diodes are present: a first parasitic diode 540 is coupled between node A and the n-type well 504 (because of the body-source connection at transistors MN1 and MN2); a second parasitic diode 542 is coupled between node NA1 and the n-type well 504 (because of the body-source connection at transistor MN5) and a third parasitic diode 544 is coupled between node NA2 and the n-type well 504 (because of the body-source connection at transistor MN6). In order to ensure proper operation of the voltage doubler circuit 100, the n-type well 504 is biased by a bias circuit 546 to a highest voltage in order to ensure that the parasitic diodes 540, 542 and 542 remain reverse biased.

Once a desired high voltage (positive or negative) generation operation has been completed by the charge pumps 200, 300, 400 described above, it is required to discharge the output voltage of the charge pump and each of its constituent voltage doubling stages to a desired low voltage level. Thus, each of the charge pumps 200, 300, 400 includes a discharge circuit 600.

The charge pumps 300 and 400 are configured to generate only a negative high voltage or positive high voltage, respectively, and so the discharge circuit 600 can be specifically configured to discharge the particular negative high voltage or positive high voltage for the given application.

Figure 10:
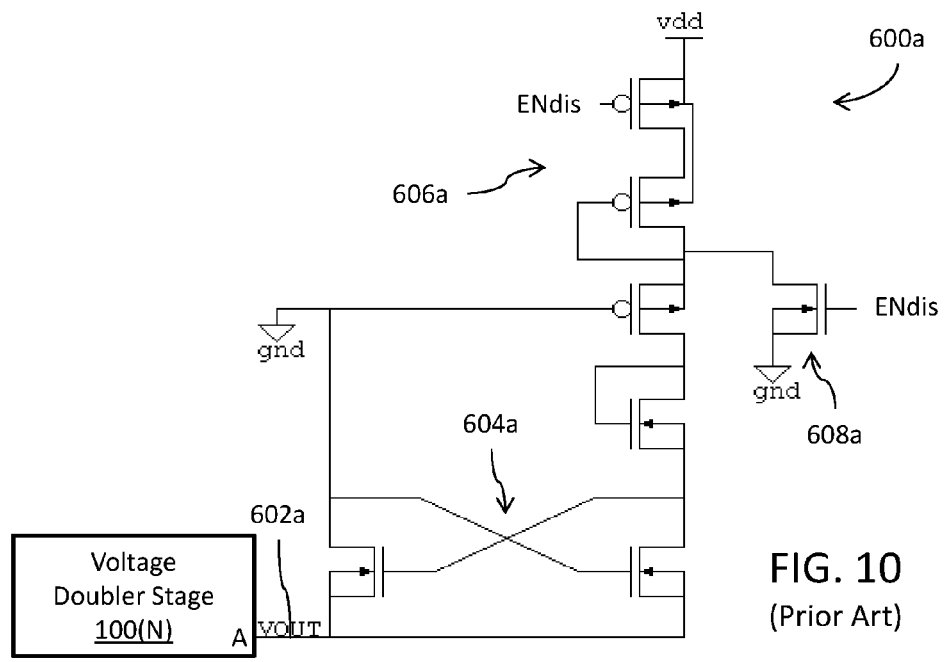
FIG. 10 is a circuit diagram for a prior art discharge circuit used with the charge pump of FIG. 6.

FIG. 10 shows a circuit diagram for a discharge circuit 600*a* (known to those skilled in the art) suitable for use with the charge pump 300 (FIG. 6) to discharge a high negative voltage to a desired low voltage (in this case, to the ground GND voltage). The discharge circuit 600*a* of FIG. 10 has an input node 602*a* coupled to the A node of the voltage doubler circuit 100(N). In a preferred implementation, one discharge circuit 600*a* is provided coupled to each A node in the charge pump 300. The discharge circuit 600*a* comprises a cross-coupled NMOS structure 604*a*, with a plurality of series-connected p-channel MOS transistors 606*a* and an n-channel MOS transistor switch 608*a*. The enable discharge signal ENdis activates the discharge phenomenon for the circuit. When ENdis=0, the charge-pump 300 is active and the discharge circuit 600*a* is disabled. When ENdis=1, the discharge circuit 600*a* is activated and the VOUT node (i.e., the A node of the coupled voltage doubler circuit stage 100(N)) is clamped to the ground GND node via the n-channel MOS transistors of the cross-coupled NMOS structure 604*a*.

Figure 11:
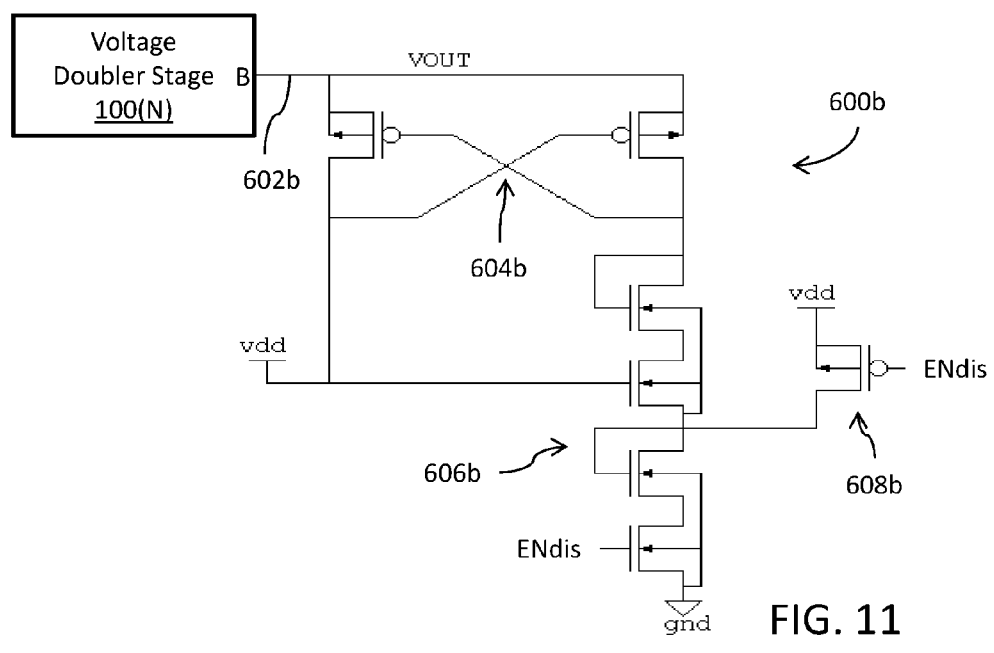
FIG. 11 is a circuit diagram for a prior art discharge circuit used with the charge pump of FIG. 7.

FIG. 11 shows a circuit diagram for a discharge circuit 600*b* (known to those skilled in the art) suitable for use with the charge pump 400 to discharge a high positive voltage to a desired low voltage (in this case, to the VDD voltage). The discharge circuit 600*b* of FIG. 11 has an input node 602*b* coupled to the B node of the voltage doubler circuit 100(N). In a preferred implementation, one discharge circuit 600*b* is provided coupled to each B node in the charge pump 400. The discharge circuit 600*b* comprises a cross-coupled PMOS structure 604*b*, with a plurality of series-connected n-channel MOS transistors 606*b* and a p-channel MOS transistor switch 608*b*. The enable discharge signal ENdis activates the discharge phenomenon for the circuit. When ENdis=0, the charge-pump 400 is active and the discharge circuit 600*b* is disabled. When ENdis=1, the discharge circuit 600*b* is activated and the VOUT node (i.e., the B node of the coupled voltage doubler stage 100(N)) is clamped to the VDD node via the p-channel MOS transistors of the cross-coupled PMOS structure 604*b*.

The discharge circuits 600*a* and 600*b* are not, however, suitable for use with the charge pump 200 that is operable in either high positive supply mode or high negative supply mode. There is a need in the art for a discharge circuit 600*c* suitable for use with the charge pump 200 that will perform the discharge phenomenon correctly regardless of the high negative voltage mode or high positive voltage mode of operation for the charge pump.

Figure 12:
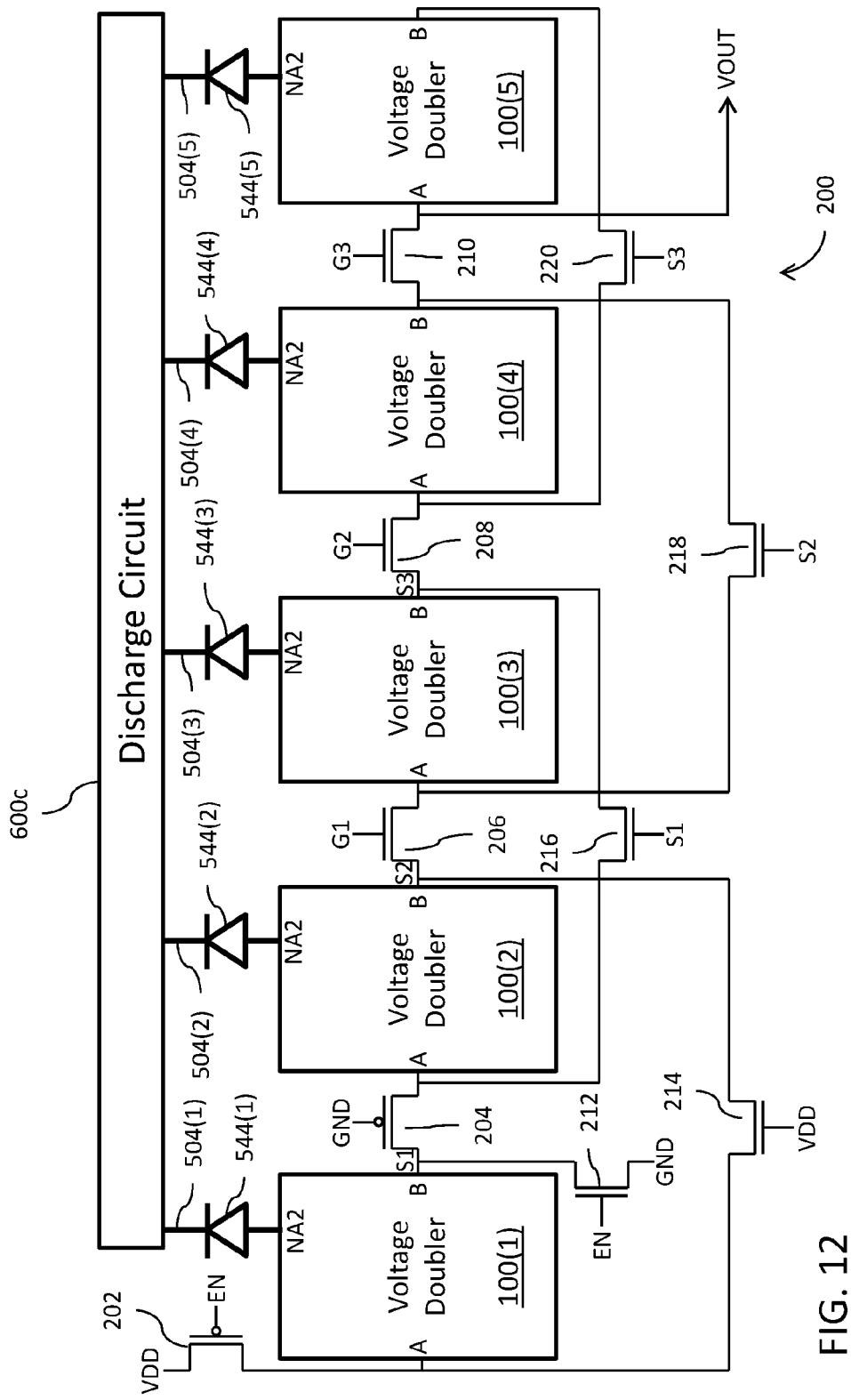
FIG. 12 is a block diagram showing the connection of a discharge circuit to the charge pump of FIG. 5.

Reference is now made to FIG. 12 showing a block diagram for connection of a discharge circuit 600*c* to the charge pump 200 of FIG. 5. Description of the charge pump 200 configuration and operation is omitted here, as such was fully described herein with reference to FIG. 5. As discussed above in connection with FIGS. 8 and 9, there are a number of parasitic diodes associated with the n-channel MOS transistors MN1, MN2, MN5 and MN6 of the voltage doubler 100. A cathode terminal of such parasitic diodes is provided by the n-type well 504. In the circuit shown in FIG. 12, the discharge circuit 600*c* is connected to the n-type wells 504(1)-504(5) of the parasitic diodes 544(1)-544(5) to control the bias voltage of the n-type wells 504 and effectuate the discharge phenomenon.

Because of the symmetric circuit configuration for the voltage doubler circuit 100, it will be understood that the discharge circuit 600*c* could, alternatively, be coupled to the n-type wells 504 of the parasitic diodes 542.

Figure 13:
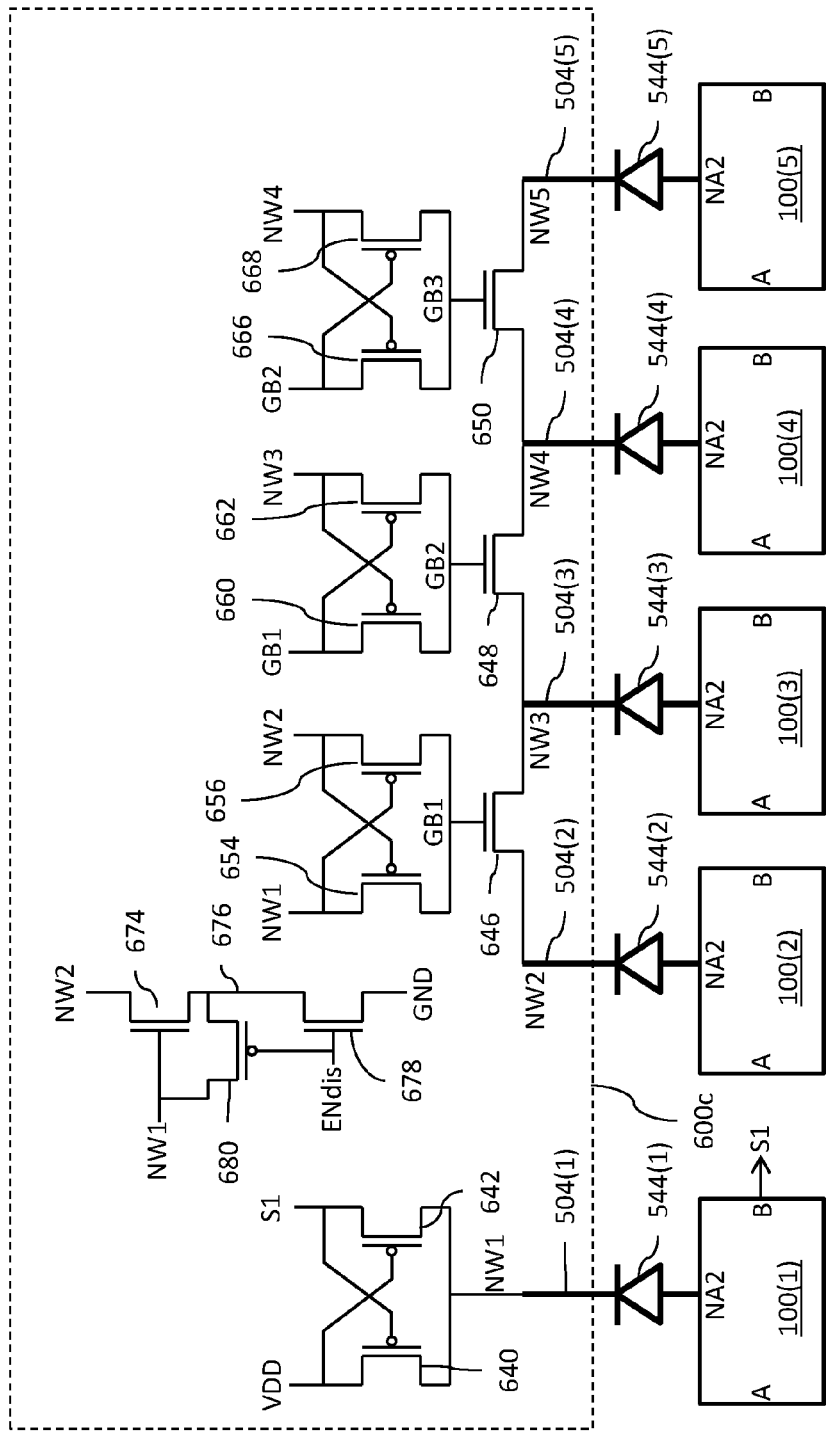
FIG. 13 is a circuit diagram for a discharge circuit used with the charge pump of FIG. 5.

Reference is now made to FIG. 13 showing a circuit diagram for the discharge circuit 600*c*. It will be noted that the transistor interconnections for the charge pump 200 as shown in FIG. 5 have been omitted in FIG. 13 to simplify the illustration, but it will be understood that the voltage doubler stages 100(1)-100(5) of charge pump 200 in FIG. 13 are connected as shown in FIG. 5 to support operation in both the high positive voltage mode and the high negative voltage mode.

The discharge circuit 600*c* is coupled to the n-type wells 504 at nodes NW1, NW2, NW3, NW4 and NW5 for the parasitic diodes 544(1)-544(5), respectively, of the voltage doubler stages 100(1)-100(5) of charge pump 200. The discharge circuit 600*c* includes a first pair of cross-coupled p-channel MOS transistors 640 and 642. The drain terminal of transistor 640 is coupled to the VDD voltage node and to the gate terminal of the transistor 642. The drain terminal of transistor 642 is coupled to the node B of the first voltage doubler circuit 100(1) (at node S1) and to the gate of transistor 640. The drain terminals of the transistors 640 and 642 are coupled together to the n-type well 504(1) at node NW1 for the first voltage doubler circuit 100(1).

The discharge circuit 600*c* further includes an n-channel MOS transistor 646 having a source terminal coupled to the n-type well 504(2) at node NW2 for the second voltage doubler circuit 100(2) and a drain terminal coupled to the n-type well 504(3) at node NW3 for the third voltage doubler circuit 100(3). An n-channel MOS transistor 648 has a source terminal coupled to the n-type well 504(3) at node NW3 for the third voltage doubler circuit 100(3) and a drain terminal coupled to the n-type well 504(4) at node NW4 for the fourth voltage doubler circuit 100(4). An n-channel MOS transistor 650 has a source terminal coupled to the n-type well 504(4) at node NW4 for the fourth voltage doubler circuit 100(4) and a drain terminal coupled to the n-type well 504(5) at node NW5 for the fifth voltage doubler circuit 100(5).

The discharge circuit 600c further includes a second pair of cross-coupled p-channel MOS transistors 654 and 656. The drain terminal of transistor 654 is coupled to the NW1 node and to the gate terminal of the transistor 656. The drain terminal of transistor 656 is coupled to the NW2 node and to the gate of transistor 654. The drain terminals of the transistors 654 and 656 are coupled together at node GB1 to the gate terminal of the n-channel MOS transistor 646.

The discharge circuit 600c also includes a third pair of cross-coupled p-channel MOS transistors 660 and 662. The drain terminal of transistor 660 is coupled to the GB1 node and to the gate terminal of the transistor 662. The drain terminal of transistor 662 is coupled to the NW3 node and to the gate of transistor 660. The drain terminals of the transistors 660 and 662 are coupled together at node GB2 to the gate terminal of the n-channel MOS transistor 648.

The discharge circuit 600c further includes a fourth pair of cross-coupled p-channel MOS transistors 666 and 668. The drain terminal of transistor 666 is coupled to the GB2 node and to the gate terminal of the transistor 668. The drain terminal of transistor 668 is coupled to the NW4 node and to the gate of transistor 666. The drain terminals of the transistors 666 and 668 are coupled together at node GB3 to the gate terminal of the n-channel MOS transistor 650.

A control circuit for the discharge circuit 600c includes an n-channel MOS transistor 674 having a drain terminal coupled to the NW2 node and a source terminal coupled to an intermediate node 676. An n-channel MOS transistor 678 has a drain terminal coupled to the intermediate node 676 and a source terminal coupled to the ground GND node. A p-channel MOS transistor 680 has a drain terminal coupled to the intermediate node 676 and a source terminal coupled the gate terminal of the transistor 674. The gate terminal of transistor 674 is further coupled to the node NW1. The gate terminals of transistors 678 and 680 are coupled together to receive an enable discharge signal ENdis.

Operation of the discharge circuit 600c is as follows:

First, consider the case where the charge pump 200 is operating in the high positive voltage mode. So, the enable signal EN=0 and the input VDD voltage is applied to node A of the first voltage doubler circuit 100(1). The following voltage conditions apply: node S1=2VDD, node S2=3VDD, node S3=4VDD and node S4=VOUT=5VDD.

With the charge-pump 200 enabled for operation: a) node NW1 is biased to the 2VDD voltage level via the first pair of cross-coupled p-channel MOS transistors 640 and 642; b) node NW2 is biased to a 3VDD-Vt voltage level via the parasitic diode 544(2) (where Vt is a diode voltage drop); c) node NW3 is biased to a 4VDD-Vt voltage level via the parasitic diode 544(3); d) node NW4 is biased to a 5VDD-Vt voltage level via the parasitic diode 544(4); and e) node NW5 is biased to a 6VDD-Vt voltage level via the parasitic diode 544(5).

When the charge-pump 200 is subsequently disabled for operation, the discharge circuit 600c is enabled for operation by asserting the enable discharge signal ENdis=1 (i.e., VDD). The discharge operation is as follows:

1) the enable signal EN=1 (i.e., VDD) to turn on transistor 212 causing node S1 (the node B of the first voltage doubler circuit 100(1)) to be discharged to the ground GND voltage;

2) with node S1 transition to the GND voltage, node NW1 goes to the VDD voltage via the operation of the pair of cross-coupled p-channel MOS transistors 640 and 642;

3) with node NW1 at the VDD voltage, and with the enable discharge signal ENdis=1 (i.e., VDD) the transistors 674 and 678 are turned on to drive node NW2 also to the ground GND voltage;

4) the transition of node NW2 to GND causes the node B of the second voltage doubler circuit 100(2) to be discharged to the Vt voltage level via the parasitic diode 544(2) (because the cathode terminal of the diode 544(2) is at GND, the charge accumulated at anode terminal is discharged via the diode);

5) with node NW2 reaching the GND voltage, and with node NW1 at the VDD voltage, the node GB1 is driven to the VDD voltage level by the second pair of cross-coupled p-channel MOS transistors 654 and 656;

6) as node GB1 reaches the VDD voltage level, the node NW3 is driven to the GND voltage by the n-channel MOS transistor 646 connected between node NW2 and node NW3;

7) the transition of node NW3 to GND causes the node B of the third voltage doubler circuit 100(3) to also discharge to the Vt voltage level via the parasitic diode 544(3);

8) with node NW3 at the GND voltage, the third pair of cross-coupled p-channel MOD transistors 660 and 662 drives the node GB1 to the VDD voltage;

9) with node GB2 at the VDD level, the n-channel MOS transistor 648 between node NW3 and node NW4 is turned on to drive node NW4 to the GND voltage;

10) with node NW4 at the ground GND voltage, the node B of the fourth voltage doubler circuit 100(4) is discharged to the Vt voltage level through the parasitic diode 544(4);

11) as node NW4 transitions to the GND voltage, the fourth pair of cross-coupled p-channel transistors 666 and 668 drive node GB2 to the VDD voltage level;

12) with node GB3 at the VDD voltage level, the node NW5 id driven to the GND voltage via actuation of the n-channel MOS transistor 650 connected between node NW4 and node NW5; and 13) the transition of node NW5 to the ground GND voltage causes the node B of the fifth voltage doubler circuit 100(5) to discharge to the Vt voltage level via the parasitic diode 544(5).

The assertion of the enable discharge signal ENdis=1 accordingly causes all the nodes B of the voltage doubler circuits 100(1)-100(5) to discharge to the Vt voltage level.

Next, consider the case where the charge pump 200 is operating in negative high voltage mode. So, the enable signal EN=1 and the input GND voltage is applied to node B of the first voltage doubler circuit 100(1). The following voltage conditions apply: node S1=GND, node S2=-VDD, node S3=-2VDD, node S4=-3VDD, node VOUT=-5VDD.

With the charge-pump 200 enabled for operation: a) node NW1 is biased to the VDD voltage level via the first pair of cross-coupled p-channel MOS transistors 640 and 642; and b) nodes NW2, NW3, NW4 and NW5 are all biased to the GND voltage level.

When the charge-pump 200 is subsequently disabled for operation, the discharge circuit 600c is enabled for operation by asserting the enable discharge signal ENdis=1 (i.e., VDD). The discharge operation is as follows:

1) the enable signal EN=0 (i.e., GND) to turn on transistor 202, thus converting the charge pump into the positive high voltage mode of operation with the input connected to GND and enable the clock signals until VOUT reaches GND;

2) because the nodes NW2-NW5 are connected to the GND voltage, the node A outputs of the corresponding voltage doubler circuit 100 stages will not go to more than the Vt voltage level (even if the circuit is used in positive charge-pump configuration); and 3) once the charge-pump and all negative voltages are discharged to the Vt voltage level, the clock signals are disabled.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

What is claimed is:

1. A circuit, comprising:
a first node configured to receive a first voltage when said circuit is configured for operation in a positive voltage boosting mode and configured to output a negative voltage when said circuit is configured for operation in a negative voltage boosting mode;
a second node configured to output a positive voltage in excess of said first voltage when said circuit is configured for operation in the positive voltage boosting mode and configured to receive a second voltage in excess of said negative voltage when said circuit is configured for operation in a negative voltage boosting mode;
first and second intermediate nodes that are capacitively coupled to receive opposite phases of a first clock signal, respectively; and
third and fourth intermediate nodes are capacitively coupled to receive opposite phases of a second clock signal, respectively.

2. The circuit of claim 1, further comprising a first transistor and second transistor connected in a cross-coupled configuration, wherein the first transistor is coupled between the first node and the first intermediate node and wherein the second transistor is coupled between the first node and the second intermediate node.

3. The circuit of claim 2, further comprising a third transistor and fourth transistor connected in a cross-coupled configuration, wherein the third transistor is coupled between the first intermediate node and the third intermediate node and wherein the fourth transistor is coupled between the second intermediate node and the fourth intermediate node.

4. The circuit of claim 3, further comprising:
a fifth transistor coupled between the first intermediate node and the second node and having a control terminal coupled to the third intermediate node; and
a sixth transistor coupled between the second intermediate node and the second node and having a control terminal coupled to the fourth intermediate node.

5. The circuit of claim 4, wherein the first through sixth transistors are all n-channel MOS transistors.

6. The circuit of claim 2, further comprising:
a fifth transistor coupled between the first intermediate node and the second node and having a control terminal coupled to the third intermediate node; and
a sixth transistor coupled between the second intermediate node and the second node and having a control terminal coupled to the fourth intermediate node.

7. The circuit of claim 6, wherein said fifth and sixth transistors are n-channel MOS transistors implemented in a triple well technology including a p-type well having source and drain regions and an isolated n-type well surrounding the p-type well.

8. The circuit of claim 7, further comprising a discharge circuit connected to the isolated n-type well and configured to discharge a voltage at one of the first and second nodes to a discharge voltage level.

9. The circuit of claim 8, wherein the discharge voltage level is a threshold voltage level of a parasitic diode formed by the p-type well and the isolated n-type well.

10. The circuit of claim 8, wherein the discharge circuit comprises a seventh transistor and eighth transistor connected in a cross-coupled configuration, wherein the seventh transistor is coupled between a positive supply voltage and the isolated n-type well and wherein the eighth transistor is coupled between said one of the first and second nodes and the isolated n-type well.

11. The circuit of claim 1, wherein the first clock signal has a first high voltage level and wherein the second clock signal has a second high voltage level different from the first high voltage level.

12. The circuit of claim 11, wherein the second high voltage level is two times the first high voltage level.

13. The circuit of claim 1, wherein the first and second clock signals have aligned phases.

14. A circuit, comprising:
a first node;
a second node;
a first transistor and second transistor connected in a cross-coupled configuration, wherein the first transistor is coupled between the first node and a first intermediate node and the second transistor is coupled between the first node and a second intermediate node;
a third transistor and fourth transistor connected in a cross-coupled configuration, wherein the third transistor is coupled between the first intermediate node and a third intermediate node and the fourth transistor is coupled between the second intermediate node and a fourth intermediate node;
a fifth transistor coupled between the first intermediate node and the second node and having a control terminal coupled to the third intermediate node;
a sixth transistor coupled between the second intermediate node and the second node and having a control terminal coupled to the fourth intermediate node;
wherein the first and second intermediate nodes are capacitively coupled to receive opposite phases of a first clock signal, respectively; and
wherein the third and fourth intermediate nodes are capacitively coupled to receive opposite phases of a second clock signal, respectively.

15. The circuit of claim 14, wherein the first clock signal has a first high voltage level and wherein the second clock signal has a second high voltage level different from the first high voltage level.

16. The circuit of claim 15, wherein the second high voltage level is two times the first high voltage level.

17. The circuit of claim 14, wherein the first and second clock signals have aligned phases.

18. The circuit of claim 14, wherein the first through sixth transistors are all n-channel MOS transistors.

19. The circuit of claim 14, wherein said fifth and sixth transistors are n-channel MOS transistors implemented in a triple well technology including a p-type well having source and drain regions and an isolated n-type well surrounding the p-type well.

20. The circuit of claim 19, further comprising a discharge circuit connected to the isolated n-type well and configured to discharge a voltage at one of the first and second nodes to a discharge voltage level.

21. The circuit of claim 20, wherein the discharge voltage level is a threshold voltage level of a parasitic diode formed by the p-type well and the isolated n-type well.

22. The circuit of claim 20, wherein the discharge circuit comprises a seventh transistor and eighth transistor connected in a cross-coupled configuration, wherein the seventh transistor is coupled between a positive supply voltage and the isolated n-type well and wherein the eighth transistor is coupled between said one of the first and second nodes and the isolated n-type well.

23. A charge pump circuit, comprising:
a plurality of boosting circuits, wherein each boosting circuit has first node and a second node and is operable in a positive voltage boosting mode to positively boost voltage from the first node to the second node and is operable in a negative voltage boosting mode to negatively boost voltage from the second node to the first node;
a first transistor coupled between a positive input voltage and the first node of a first one of the plurality of boosting circuits, said first transistor actuated by a first logic state of a first control signal to place the charge pump circuit in the positive voltage boosting mode;
a second transistor coupled between a ground input voltage and the second node of the first one of the plurality of boosting circuits, said second transistor actuated by a second logic state of the first control signal to place the charge pump circuit in the negative voltage boosting mode;
a third transistor coupled between the first node of the first one of the plurality of boosting circuits and the second node of a second one of the plurality of boosting circuits, said third transistor biased to permit conduction from the first node of the first one of the plurality of boosting circuits to the second node of the second one of the plurality of boosting circuits only when the charge pump circuit is operable in the negative voltage boosting mode; and
a fourth transistor coupled between the second node of the first one of the plurality of boosting circuits and the first node of the second one of the plurality of boosting circuits, said fourth transistor biased to permit conduction from the second node of the first one of the plurality of boosting circuits to the first node of the second one of the plurality of boosting circuits only when the charge pump circuit is operable in the positive voltage boosting mode.

24. The charge pump circuit of claim 23, wherein said first and fourth transistors are of a first conductivity type and said second and third transistors are of a second conductivity type.

25. The charge pump circuit of claim 24, wherein the third transistor is biased by the positive input voltage and the fourth transistor is biased by the ground input voltage.

26. The charge pump circuit of claim 23, wherein the first node of the second one of the plurality of boosting circuits generates an output voltage of substantially the negative of the positive input voltage when the boosting circuits are operable in the negative voltage boosting mode, and wherein the second node of the second one of the plurality of boosting circuits generates an output voltage of substantially twice the positive input voltage when the boosting circuits are operable in the positive voltage boosting mode.

27. The charge pump circuit of claim 23, wherein each of the plurality of boosting circuits comprises:
first and second intermediate nodes that are capacitively coupled to receive opposite phases of a first clock signal, respectively; and
third and fourth intermediate nodes are capacitively coupled to receive opposite phases of a second clock signal, respectively.

28. The charge pump circuit of claim 27, wherein the first clock signal has a first high voltage level and wherein the second clock signal has a second high voltage level different from the first high voltage level.

29. The charge pump circuit of claim 28, wherein the second high voltage level is two times the first high voltage level.

30. The charge pump circuit of claim 27, wherein the first and second clock signals have aligned phases.

31. The charge pump circuit of claim 23, wherein each of the plurality of boosting circuits comprises n-channel MOS transistors implemented in a triple well technology including a p-type well having source and drain regions and an isolated n-type well surrounding the p-type well.

32. The charge pump circuit of claim 31, further comprising a discharge circuit connected to the isolated n-type well in each of the plurality of boosting circuits, said discharge circuit configured to discharge a voltage at one of the first and second nodes in each of the plurality of boosting circuits to a discharge voltage level.

33. The charge pump circuit of claim 32, wherein the discharge voltage level is a threshold voltage level of a parasitic diode between the p-type well and the isolated n-type well.

34. The charge pump circuit of claim 32, wherein the discharge circuit comprises a fifth transistor and sixth transistor connected in a cross-coupled configuration, wherein the fifth transistor is coupled between the positive input voltage and the isolated n-type well within the first one of the plurality of boosting circuits and wherein the sixth transistor is coupled between the second node of the first one of the plurality of boosting circuits and the isolated n-type well within the first one of the plurality of boosting circuits.

35. The charge pump circuit of claim 34, wherein the discharge circuit further comprises:
a seventh transistor coupled between the isolated n-type well within the second one of the plurality of boosting circuits and an intermediate node and having a control terminal coupled to the isolated n-type well within the first one of the plurality of boosting circuits;
an eighth transistor coupled between the intermediate node and the ground input voltage and having a control terminal coupled to receive a second control signal that is asserted when said discharge circuit is actuated; and
a ninth transistor coupled between the intermediate node and the control terminal of the seventh transistor.

36. The charge pump circuit of claim 35, wherein the seventh and ninth transistors are of a same conductivity type and the eighth transistor is of an opposite conductivity type.

37. The charge pump circuit of claim 34, wherein the discharge circuit further comprises:
a tenth transistor coupled between the isolated n-type well within the second one of the plurality of boosting circuits and the isolated n-type well within a third one of the plurality of boosting circuits; and
an eleventh transistor and twelfth transistor connected in a cross-coupled configuration, wherein the eleventh transistor is coupled between the isolated n-type well within the first one of the plurality of boosting circuits and a control terminal of the tenth transistor and wherein the twelfth transistor is coupled between the isolated n-type well within the second one of the plurality of boosting circuits and the control terminal of the tenth transistor.

38. The charge pump circuit of claim 37, further comprising:
an additional third transistor coupled between the first node of the second one of the plurality of boosting circuits and the second node of the third one of the plurality of boosting circuits, said additional third transistor biased to permit conduction from the first node of the second one of the plurality of boosting circuits to the second node of the third one of the plurality of boosting circuits only when the boosting circuits are operable in the negative voltage boosting mode; and
an additional fourth transistor coupled between the second node of the second one of the plurality of boosting circuits and the first node of the third one of the plurality of boosting circuits, said additional fourth transistor biased to permit conduction from the second node of the second one of the plurality of boosting circuits to the first node of the third one of the plurality of boosting circuits only when the boosting circuits are operable in the positive voltage boosting mode.

39. The charge pump circuit of claim 38, wherein the discharge circuit further comprises:
a thirteenth transistor coupled between the isolated n-type well within the third one of the plurality of boosting circuits and the isolated n-type well within a fourth one of the plurality of boosting circuits; and
a fourteenth transistor and fifteenth transistor connected in a cross-coupled configuration, wherein the fourteenth transistor is coupled between the control terminal of the tenth transistor and a control terminal of the thirteenth transistor and wherein the fifteenth transistor is coupled between the isolated n-type well within the third one of the plurality of boosting circuits and the control terminal of the thirteenth transistor.

40. The charge pump circuit of claim 39, further comprising:
a further third transistor coupled between the first node of the third one of the plurality of boosting circuits and the second node of the fourth one of the plurality of boosting circuits, said further third transistor biased to permit conduction from the first node of the third one of the plurality of boosting circuits to the second node of the fourth one of the plurality of boosting circuits only when the boosting circuits are operable in the negative voltage boosting mode; and
a further fourth transistor coupled between the second node of the third one of the plurality of boosting circuits and the first node of the fourth one of the plurality of boosting circuits, said further fourth transistor biased to permit conduction from the second node of the third one of the plurality of boosting circuits to the first node of the fourth one of the plurality of boosting circuits only when the boosting circuits are operable in the positive voltage boosting mode.

\* \* \* \* \*